United States Patent Office 3,793,242
Patented Feb. 19, 1974

1

3,793,242
FOAMABLE THERMOPLASTIC POLYMER GRANULES AND METHOD FOR MAKING
Gerald D. Ilavsky, Sarnia, Ontario, Canada, assignor to The Dow Chemical Company, Midland, Mich.
No Drawing. Filed Aug. 17, 1972, Ser. No. 281,525
Int. Cl. C08j 1/26
U.S. Cl 260—2.5 B                    8 Claims

ABSTRACT OF THE DISCLOSURE

Foamable styrene polymers are prepared by coating expandable styrene polymer granules with behenic acid. Improved cooling times and anti-clumping properties are obtained, together with lowered steam pressures required for molding.

This invention relates to improved foamable thermoplastic granules and a method of making such granules, and more specifically is concerned with improved alkenyl aromatic resinous granules containing a volatile raising agent.

Expandable synthetic resinous granules, and particularly those of styrene polymers and polystyrene, have found wide commercial acceptance for the molding of various shaped articles. Such expandable particles or granules are generally prepared in the form of small beads, the beads are then heated, frequently by means of hot air or steam, to cause partial foaming and provide what is frequently referred to as pre-expanded beads. The pre-expanded beads are usually aged in an air atmosphere, placed within a closed mold and heated by means of a heat exchange fluid, which most frequently is steam, to cause further expansion of the beads and to cause the partially expanded particles to knit together to form a unitary body. Although many compositions can be prepared in the form of expandable beads, certain characteristics are necessary to prepare a commercially acceptable product. One particularly undesirable feature of some expandable styrene polymer particles is that on pre-foaming, the particles tend to clump together to form aggregates and are not in desirably free-flowing condition, thus presenting problems in handling of the particles or beads in the pre-foaming equipment and difficulty in transferring the beads through small openings such as are found in mold filling ports. Various surface additives such as zinc stearate, calcium phosphate and long chain fatty acid amides have been employed to overcome the clumping tendency. It is desirable that pre-foamed particles not cluster together due to electrostatic forces and resist free-flow; i.e., have antistatic characteristics. It is highly desirable that such particles, on molding, fuse together into a strong unitary body while requiring a minimum amount of steam. It is undesirable that a body molded from the particles adhere to the mold after molding. Various mold release agents, including mineral oil, silicone oils and the like, have been employed to facilitate removal of the molded body. One critical characteristic of expandable beads for commercial acceptability is a characteristic frequently referred to as "cooling time." Cooling time usu-

2 ally refers to the period of time between the time when steam or other heat exchange fluid is no longer fed to the mold and the time when the mold may be opened and a dimensionally stable product or article removed therefrom. If a molded article is removed from the mold prematurely; that is, before the article has cooled sufficiently, expansion will occur and a product with undesired dimensions and form is obtained. It is highly desirable that foamable thermoplastic polymer granules exhibit the characteristic of short cooling time. Oftentimes to obtain desirable moldings, it is necessary that expandable beads be aged after preparation for a period of at least 24 hours.

It would be desirable if there were available a treatment for expandable synthetic resinous particles which could be applied to the external or outer surface and provide substantially improved characteristics.

It would also be desirable if there were available an improved foamable thermoplastic resinous composition which exhibited a low clumping tendency and a method of preparing such a composition.

It would further be desirable if there were available an improved method for the preparation of foamable synthetic resinous particles having a short cooling time and exhibiting good fusion characteristics on molding.

These benefits and other advantages in accordance with the method of the present invention are achieved by providing an alkenyl aromatic resin in the form of a mass of particles containing a volatile fluid foaming agent, adding to the mass of particles from about 0.2 to about 2.0 weight percent, based on the total weight of the particles, of a behenic acid, and coating the external surface of the expandable resinous particles with the behenic acid.

Also contemplated within the scope of the present invention is a mass of expandable alkenyl aromatic resinous particles having external surfaces containing a fluid foaming agent, the particles on heating being capable of expanding and forming a plurality of closed, gas-filled cells, the improvement which comprises a generally uniform coating on the external surfaces of the particles of from about 0.2 to about 2.0 weight percent, based on the weight of the expandable particles, of a behenic acid, and most advantageously from about 0.3 to about 0.5 weight percent of the acid.

By the term "alkenyl aromatic resin" is meant a solid polymer of one or more polymerizable alkenyl aromatic compounds. The polymer or copolymer comprises in chemically combined form at least 70 percent by weight of at least one alkenyl aromatic compound having the general formula

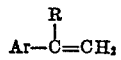

wherein Ar represents an aromatic hydrocarbon radical, or an aromatic halohydrocarbon radical of the benzene series and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene or ar-bromostyrene; the solid copolymers of two or more of such alkenyl aromatic compounds with minor amounts of other readily polymerizable olefinic compounds such as methylmethacrylate or acrylonitrile, etc.

Expandable beads useful for the practice of the present invention are well known in the art and are set forth in the following U.S. patents: 2,681,321; 2,744,291; 2,779,062; 2,787,809; 2,950,261 and 3,086,885, the teachings of which are herewith incorporated by reference. The present invention is employed with particular advantage with polystyrene. Behenic acids of commercial purity are found eminently satisfactory.

Particles of the present invention beneficially are prepared by admixing the behenic acid with expandable resin particles by mechanical agitation such as in a ribbon blender, tumble blender, fluid bed drier, pneumatic conveyor, vibrating conveyor, conical blender or any other common device for the dry blending of particulate solids. Generally it is advantageous to admix the acid and polymer particles at a temperature below the foaming temperature of the resin, which in the case of polystyrene is about 100° C. For polystyrene a convenient blending range is between about 60° C. and 80° C. and provides the most rapid blending. However, blending at room temperature and even below room temperature; that is, 20° C. to 25° C., provides a particle of maximum expandability because of minimum loss of blowing agent.

Particles prepared in accordance with the present invention are eminently suitable for molding a wide variety of materials such as insulating containers, boxes, packing, pipe insulation and the like. The acid-treated particles of the present invention exhibit a rapid cooling time, have antistatic properties, broad molding range, excellent flowability of the particles and require a low minimum steam pressure for molding.

By way of further illustration, various samples are prepared by admixing 100 parts of expandable polystyrene particles which contain as a volatile fluid foaming agent about 6 weight percent pentane. The particles are then coated in a tumble blender with various weight percentages of a behenic acid as set forth in the table. The coated granules are evaluated by prefoaming to a density of about 1.5 pounds per cubic foot, aged for 24 hours and evaluated for clumping and molding by molding in a closed mold under generally constant conditions utilizing steam heat. In the wall of the cavity of the mold is disposed a pressure sensitive diaphragm connected to a pressure gauge. The time in minutes required for the pressure gauge to indicate zero after molding is set forth in Table I under the heading "Cooling Time." The mold is opened after various periods of time and the molded part removed and examined visually for conformation to the mold and for fusion of the particles. Generally satisfactory fusion is obtained using steam and mold cavity pressures of from about 14 to 17 pounds minimum per square inch to about 24 pounds per square inch. The molding range is the range of steam pressure wherein 50 percent bead to bead fusion is obtained and pressures below which shrinkage of the molded part visible to the unaided eye is not obtained.

TABLE I

| Sample | Dry density [1] | Steam pressure [2] | Cooling time [3] | Percent fusion | Burn | Mold range [4] | Minimum cool time [3] |
|---|---|---|---|---|---|---|---|
| 1........ 0.49% behenic acid.... | 1.42 | 13 | 1.30 | <50 | Nil........ | 14-24(10) | 1.63 |
|  |  | 14 | 1.63 | 50 | Nil........ |  |  |
|  |  | 15 | 1.70 | >50 | Nil........ |  |  |
|  |  | 22 | 2.13 | >50 | Nil........ |  |  |
|  |  | 24 | 2.18 | >50 | Slight...... |  |  |
| 2........ 0.4% behenic acid..... | 1.33 | 13 | 1.25 | <50 | Nil........ | 14-24(10) | 1.82 |
|  |  | 14 | 1.82 | 50 | Nil........ |  |  |
|  |  | 15 | 1.92 | >50 | Nil........ |  |  |
|  |  | 24 | 2.25 | >50 | Very slight.. |  |  |
| 3........ 0.3% behenic acid..... | 1.33 | 15 | 2.10 | <50 | Nil........ | 17-24 (7) | 2.15 |
|  |  | 17 | 2.15 | 50 | Nil........ |  |  |
|  |  | 24 | 2.42 | >50 | Nil........ |  |  |
|  |  | 25 | 2.33 | >50 | Severe...... |  |  |
| 4........ 0.2% behenic acid..... | 1.34 | 15 | 2.12 | <50 | Nil........ | Nil .......... |  |
|  |  | 24 | 2.47 | <50 | Nil........ |  |  |
|  |  | 26 | 2.37 | >50 | Severe...... |  |  |

[1] Pounds per cubic foot.
[2] Pounds per square inch gauge.
[3] Minutes.
[4] Pounds per square inch.

As is apparent from the foregoing specification, the present invention is susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention.

What is claimed is:

1. A mass of expandable alkenyl aromatic resinous particles having external surfaces, the particles containing a fluid foaming agent, the particles on heating being capable of expanding and forming a plurality of closed, gas-filled cells, the improvement which comprises, a generally uniform coating on the external surface of the particles, the coating consisting essentially of from about 0.2 to about 2.0 weight percent, based on the weight of the expanded particles, of behenic acid.

2. The mass of claim 1 wherein the alkenyl aromatic resinous particles are a styrene polymer.

3. The mass of claim 1 wherein the mass contains from about 0.3 to about 0.5 weight percent of the acid.

4. The mass of claim 1 wherein the alkenyl aromatic resinous particles are polystyrene particles.

5. A method for the preparation of expandable synthetic resinous particles having highly desirable molding characteristics, the steps of the method comprising
   providing an alkenyl aromatic resin in the form of a mass of particles containing a volatile fluid foaming agent, the particles being capable of expanding to form a plurality of gas-filled cells,
   adding to the mass of particles from about 0.2 to about 2.0 weight percent, based on the total weight of the particles, of behenic acid.

6. The method of claim 5 wherein the acid is distributed on the particles by mechanical agitation.

7. The method of claim 5 wherein the acid is distributed on the particles at a temperature below about 100° C.

8. The method of claim 5 wherein the alkenyl aromatic resinous particles are polystyrene particles.

(References on following page)

References Cited

UNITED STATES PATENTS 2,989,782  6/1961  Barkhuff, Jr. et al. -- 260—2.5 B
3,461,088  8/1969  Stahnecker et al. --- 260—2.5 B

OTHER REFERENCES

"Chemistry of Organic Compounds," Carl R. Noller, 2nd ed. (1957), p. 147.

MURRAY TILLMAN, Primary Examiner
M. FOELAK, Assistant Examiner

U.S. Cl. X.R.

117—100 C; 260—23 H; 264—53